March 9, 1948. J. DE FRANCISCI 2,437,460
ALIMENTARY PASTE EXTRUSION APPARATUS
Filed March 28, 1944 4 Sheets-Sheet 2
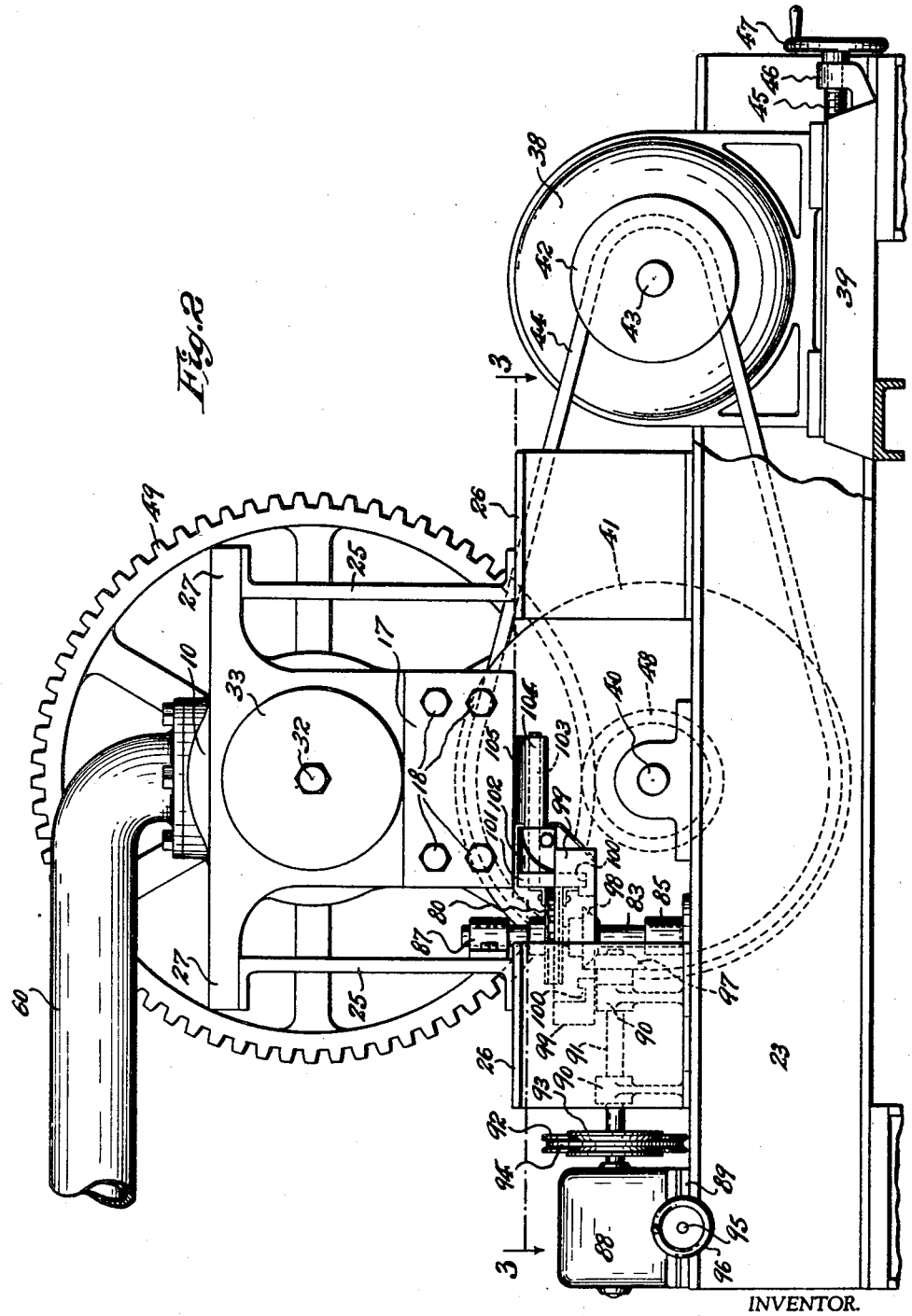
INVENTOR.
Joseph De Francisci,
BY
George D. Richards,
ATTORNEY.

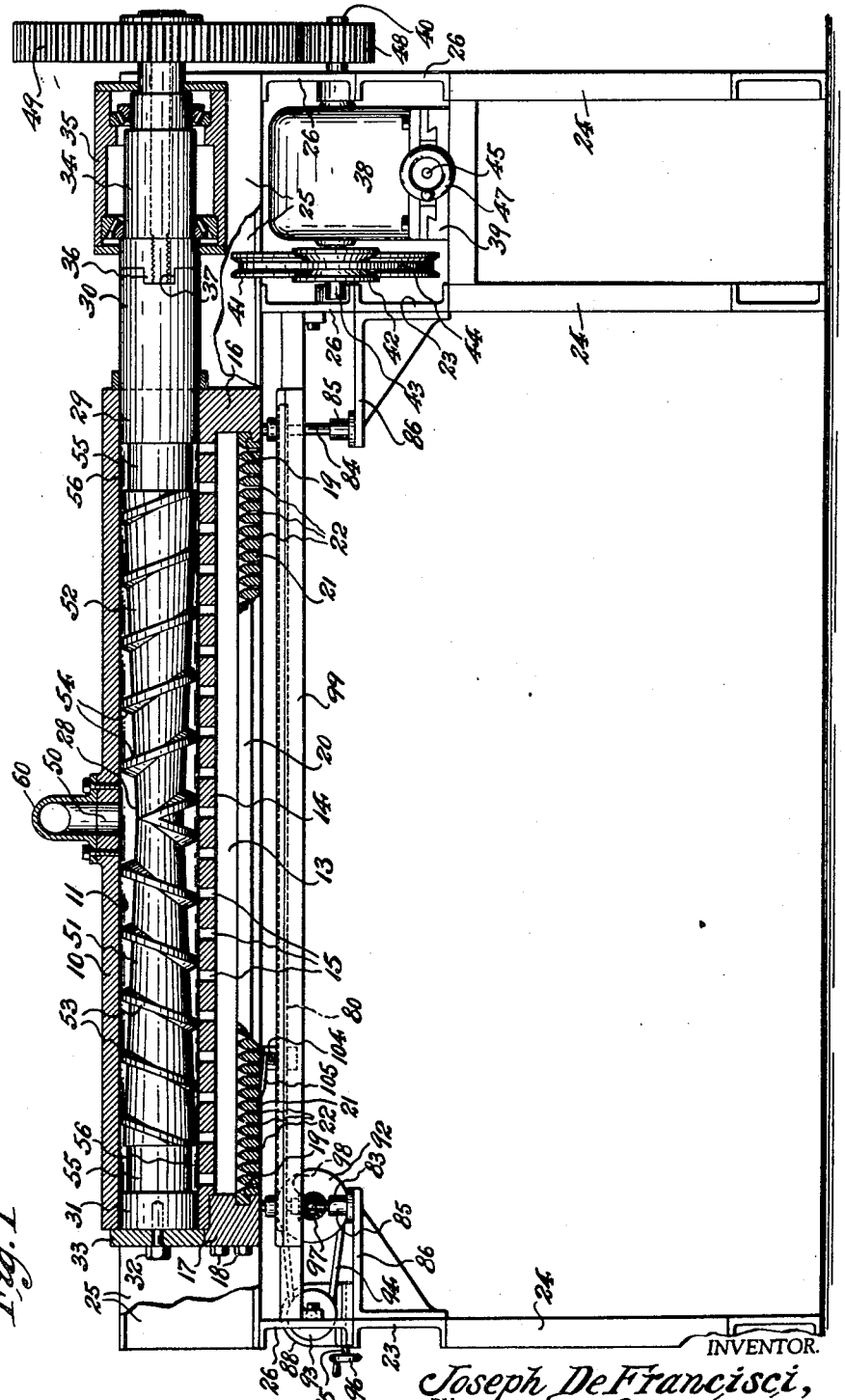

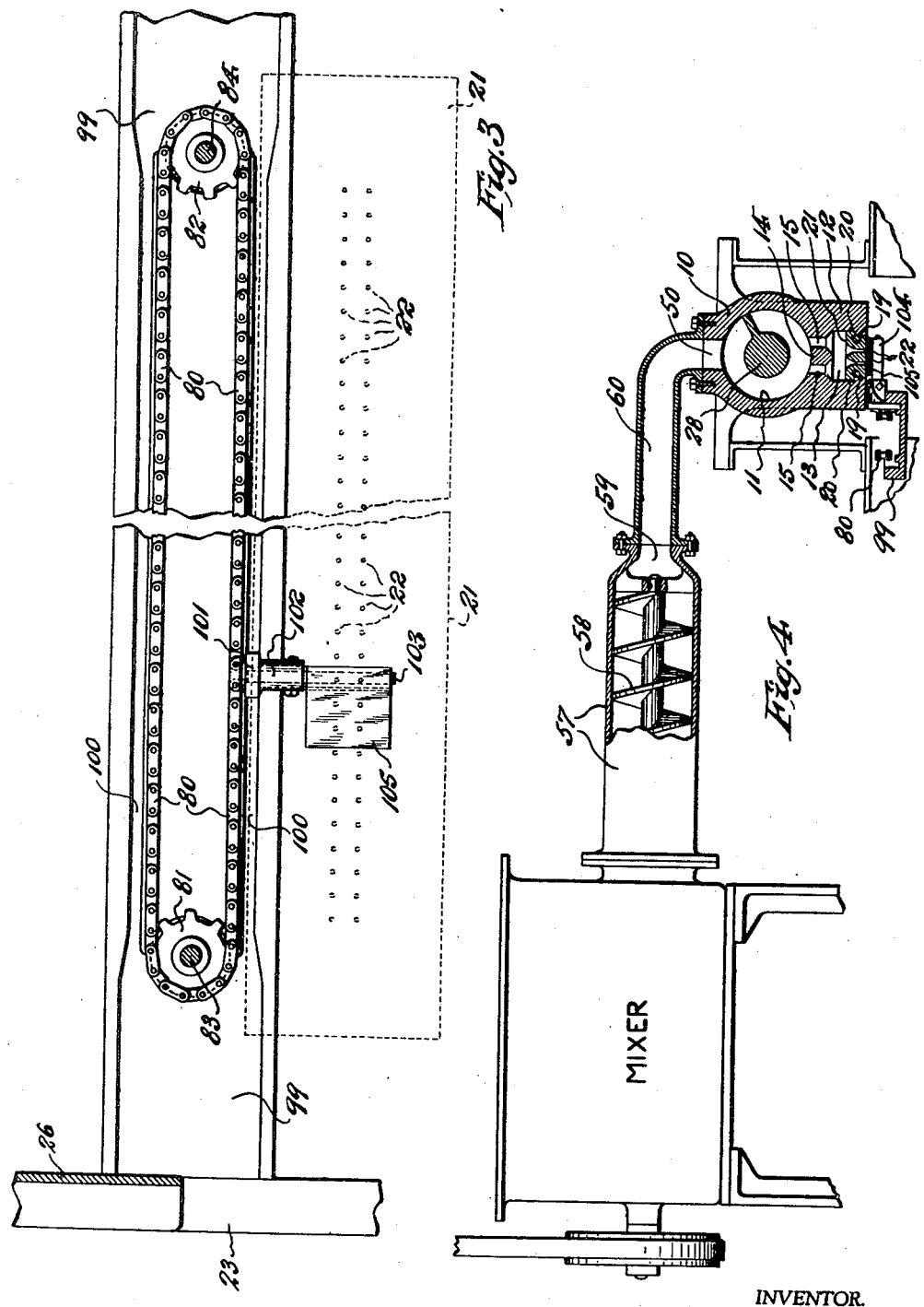

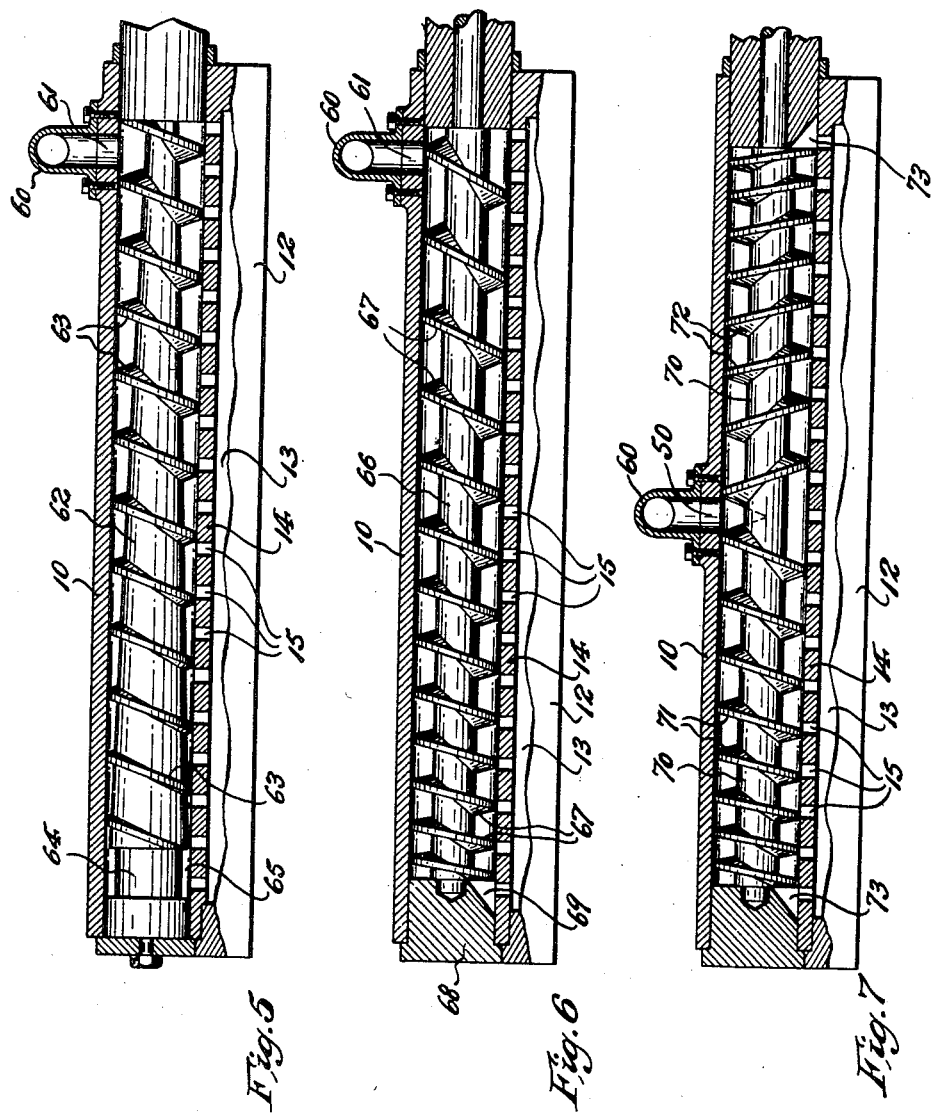

Patented Mar. 9, 1948

2,437,460

UNITED STATES PATENT OFFICE 2,437,460

ALIMENTARY PASTE EXTRUSION APPARATUS

Joseph De Francisci, Brooklyn, N. Y.

Application March 28, 1944, Serial No. 528,401

8 Claims. (Cl. 107—14)

1

This invention relates to apparatus for producing alimentary paste products, such as spaghetti, macaroni and other forms of both long and short alimentary paste products; and the invention has reference, more particularly, to novel apparatus for continuously extruding alimentary paste through forming die means.

This invention has for an object to provide a novel apparatus for extruding alimentary paste, whereby the paste forms are continuously and uniformly expressed through an elongated die so as to issue therefrom in linearly disposed and spaced relation; the thus expressed paste forms being adapted to be cut away at the external face of the die in such manner as to optionally produce either long or short forms; and whereby, if produced in long forms, the strings thereof are spaced in a linear row or rows adapted to be applied to a supporting rod, used in the racking of the product for drying, and then cut away from the die.

The invention has for another object to provide a novel continuously operable paste extrusion means cooperative with an elongated die, wherein the expressing pressure is effected by means of a rotatable scroll, the volumetric capacity of which diminishes progressively from a paste receiving point to a point or points remote therefrom, so that compensation for discharge of paste along the die from a point adjacent said paste receiving point to remote point or points of the die is automatically attained, and the paste expressing pressure is substantially uniformly maintained throughout the length and at all discharge orifices of the die.

Another object of the invention is to provide in combination with a continuously operable paste extrusion means of the kind stated, and for cooperation with the die thereof, a novel traveling cutter means for severing the extruded paste forms issuing from the die orifices.

A still further object of the invention is to provide means in combination with the continuously operable paste extruding means adapted to deliver paste to the paste expressing scroll thereof under constant pressure calculated to keep the scroll fully loaded, whereby extrusion losses are continuously replaced during operation thereof.

Other objects of this invention, not at this time more particularly enumerated, will be understood from the following detailed description of the same.

Illustrative embodiments of alimentary paste extrusion apparatus according to this invention are shown in the accompanying drawings, in which:

Fig. 1 is an elevational view in part longitudinal section of apparatus constructed in accordance with the invention; Fig. 2 is an end elevation of the apparatus, viewed from the left in Fig. 1, but drawn on a substantially enlarged scale; Fig. 3 is a fragmentary horizontal section, taken on line 3—3 in Fig. 2, the position of the die being indicated by broken lines.

Fig. 4 is a fragmentary transverse vertical sectional view of the apparatus, including a more or less schematic showing of one means for delivering paste thereto under constant pressure.

Figs. 5, 6 and 7 are respectively fragmentary longitudinal sectional views showing various modified forms of paste expressing scrolls for expressing paste through the die of the apparatus.

Similar characters of reference are employed in the above described views to indicate corresponding parts.

An illustrative embodiment of the paste extrusion apparatus according to this invention, as shown in Figs. 1 to 4 inclusive of the drawings, comprises a horizontally disposed expresser head 10 provided with a cylindrical bore 11 extending longitudinally therethrough. Said expresser head 10 is formed along its under or bottom portion with a downwardly open chambered extension 12, the chamber 13 of which is parallel to the cylindrical bore 11 and separated therefrom by a wall 14 having suitably arranged longitudinally spaced ports 15 to provide communication between said bore 11 and chamber 13. The ends of said chamber 13 are closed by end walls 16 and 17, at least one of which, as e. g. the end wall 17, is detachable from the extension 12, being normally secured in closed position by bolts 18. The walls of said head extension 12 are provided with internal ledges 19 coincident with its bottom face, whereby to receive and support the carrying flanges 20 of a die plate 21 which is adapted to be thus disposed across the bottom open side of said head extension. Said die plate 21 may be entered and removed from the head extension 12 by removing the end wall 17, and sliding the die plate endwise into or out of the chamber 13, as the case may be. Formed in said die plate, in suitably spaced relation throughout the length thereof, are a multiplicity of extrusion or die orifices 22 through which the paste is to be extruded; said orifices being suitably shaped to obtain a desired form of paste product.

The expresser head 10 is supported by a framework of any suitable form and design. For example, such framework may comprise end cross beams 23 carried by leg beams or standards 24, and including laterally spaced longitudinal carrier beams 25 supported by pedestal members 26 from and so as to extend between said end cross beams. The expresser head 10 is provided along opposite sides thereof, for lateral extension therefrom, with hanger flanges 27 which bear upon said carrier beams 25, whereby to suspend the expressor head 10 therebetween, and so as to leave its bottom extension 12 and contained die plate 21, free from underlying obstruction to downward extrusion therefrom of extruded paste forms issuing from the die plate orifices.

Arranged to extend axially through the cylindrical bore 11 of the expresser head 10, from end to end thereof, is a rotatable extruding pressure exerting scroll 28, having at its driven end a journal portion 29 which fits the bore 11, and which is sized to provide an exteriorly projecting end portion 30. At its opposite, or free end, said scroll 28 is provided with a journal portion 31 which also fits the bore 11, but terminates flush with the adjacent end of the expresser head 10. Attached to outer end of said journal portion 31, by suitable fastening means, such as a bolt or bolts 32, is a diametrically enlarged cap plate 33, which laps the expresser head end.

The means for driving the extruding pressure exerting scroll 28 comprises a drive shaft 34 which is mounted in a combined supporting and thrust bearing means 35 fixed between the carrier beams 25, so as to be axially aligned with said scroll 28. Said drive shaft 34 is coupled with said scroll in driving relation thereto by clutch means, comprising e. g. cooperative male and female clutch elements 36 and 37 with which said shaft and the end portion 30 of the scroll journal portion 29 are provided. The drive shaft 34 may be driven from any suitable source of power. An illustrative driving arrangement comprises an electric power motor 38 which is adjustably mounted on a platform 39, the latter being suitably affixed to and supported by the framework. Journaled in the framework of the apparatus is a suitably located counter-shaft 40, on which is mounted the driven pulley 41 of a variable speed transmission, the driving pulley 42 of which is mounted on the motor shaft 43; the power of said driving pulley 42 being transmitted to said driven pulley by the driving belt 44. An adjusting screw 45, threaded through a nut bracket 46 with which the motor platform 39 is provided, is coupled to the motor base, and may be actuated by the hand wheel 47. By means of the adjusting screw 45, the motor 38 may be adjusted back and forth, to alter the speed ratio of the driving and driven pulleys 42—41, and thus the driving speed of the counter-shaft 40. Affixed on said counter-shaft 40 is a spur gear 48 which meshes with and drives a gear wheel 49 which is affixed on the scroll drive shaft 34.

In one embodiment thereof, as shown in Fig. 1, the extruding pressure exerting scroll 28 is provided in a form adapted to produce a two-way distribution of paste from an intake port 50, entering laterally through the expresser head wall for communication with the medial portion of the bore 11 thereof, toward the respective opposite ends of said bore, while at the same time exercising expressing pressure upon the distributed paste in a manner adapted to uniformly discharge the same through the ports 15 into the die plate chamber 13, and thence through the orifices 22 of the die plate. To this end, the scroll body 28 is provided with oppositely extending conico-cylindrical portions 51 and 52 having their small ends opposed and joined substantially at the medial portion of the body, and adjacent to said paste intake port 50, and thence gradually increasing in diameter toward their outer ends. One said conico-cylindrical portion 51 is provided with a left hand spiral flange or scroll thread 53 of desired pitch and of uniform external diameter conformable to the internal diameter of the expresser head bore 11; and the other said conico-cylindrical portion 52 is provided with a right hand spiral flange or scroll thread 54 of corresponding pitch and likewise of uniform external diameter conformable to the internal diameter of said expresser head bore 11.

In operation, when the scroll 28 is rotated, the oppositely running spiral flanges or scroll threads 53—54 divide the incoming paste so as to convey the same in oppositely moving masses respectively toward opposite ends of the expresser head bore 11, while at the same time exerting such lateral pressure on the thus distributed paste masses as to express portions thereof laterally through the ports 15 into the chamber 13, and thence through the die-plate orifices 22.

Owing to the gradually diminishing space intermediate the surface of the bore 11 and the outwardly divergent surfaces of the conico-cylindrical portions 51 and 52 of the scroll 28, constant distributive flow of the paste, as longitudinally advanced by the spiral flanges or scroll threads 53—54, at a substantially uniform speed toward opposite ends of the bore 11 is maintained, and is attended by maintenance of substantially uniform lateral paste expressing pressure at all points along said conico-cylindrical portions and the length of the underlying die plate, notwithstanding the progressive reduction of volume of said on-moving paste masses due to discharge of paste through the ports 15, chamber 13 and die orifices 22, since the progressively reduced area and capacity of the onward path of paste movement automatically compensates for such loss of volume.

Beyond the outer ends of the conico-cylindrical portions 51 and 52, which are of major diameter, and between said ends and the closed ends of the expresser head bore 11, the scroll body 28 formed to provide cylindrical end portions 55 of reduced diameter, whereby to form, at such points, clearance spaces 56 of somewhat increased capacity to accommodate any excess of paste which is forced beyond the outer or terminal ends of the spiral flanges or scroll threads 53—54. Said clearance spaces communicate with adjacent ports 15, through which said excess paste is expressed and ultimately extruded through underlying die-plate orifices 22.

The extrusion apparatus is adapted to be operated in conjunction with means which functions to continuously deliver paste into the expresser head thereof under a constant pressure calculated to keep the scroll fully loaded throughout the entire period of operation thereof. Means for such purpose may optionally be of any desired type, and may be operated by hydraulically or mechanically induced pressure. By way of illustration, a feed means operative to feed paste by mechanically induced pressure is schematically shown in Fig. 4, and comprises any suitable dough or paste mixing apparatus adapted to discharge its paste output to the housing 57 of a rotated feed screw 58. The outlet end 59 of said housing 57 is connected in communication with the intake port 50 of the expresser head 10 by a suitable paste delivery conduit 60. The feed screw 58 is operated at suitable speed calculated to feed paste at a predetermined constant pressure and at such rate as will keep the expresser head bore 11 filled and the scroll 28 fully loaded; in other words paste delivery to the expresser head bore 11 will be maintained at a rate calculated to keep pace with the rate of extrusion of the paste from the expresser head, while at the same time maintaining the pressure of the delivered paste constant so as to avoid either under or over loading of the expresser head bore and the scroll operating therein.

The specific form of the extruding pressure exerting scroll 28 is subject to variation, while nevertheless providing the required progressive diminution of its volumetric capacity from the paste receiving point to a point or points remote therefrom. Examples of various modified forms of the scroll 28 are shown in Figs. 5, 6 and 7.

In Fig. 5 the modified form of scroll therein shown is adapted to produce one-way distribution of paste from an intake port 61 located adjacent one end of the expresser head bore 11 toward the opposite end thereof. To this end the scroll comprises a single conico-cylindrical body 62 having its small end adjacent to the intake port 61, and thence gradually increasing in diameter toward its opposite end. Said body 62 is provided with a spiral flange or scroll thread 63 of desired pitch and of uniform external diameter conformable to the internal diameter of the expresser head bore 11. Intermediate the large end of the conico-cylindrical body 62 and the adjacent closed end of the bore 11, the scroll is provided with an end portion 64 of reduced diameter which forms with the bore 11 an excess paste clearance space 65. It will be obvious that the described modified form of scroll functions, in the manner and with the advantages heretofore pointed out, to progressively diminish the volume of on-going paste in compensation for extrusion thereof along and through the die plate 21, while nevertheless maintaining the lateral expressing pressure substantially uniform throughout the area of the latter.

In Fig. 6 is shown another modified form of scroll of a type adapted to produce one-way distribution of paste from the intake port 61 located adjacent one end of the expresser head bore 11 toward the opposite end thereof. This form of scroll comprises a cylindrical body 66, the same being provided with a spiral flange or scroll thread 67 of uniform external diameter conformable to the internal diameter of the expresser head bore 11, but gradually diminishing in pitch from its paste receiving end toward the end thereof remote from the paste intake port 61, whereby its volumetric capacity progressively diminishes between such points, so that paste expressing pressure is uniformly maintained throughout the area of the die-plate 21, while the diminishing volume of paste compensates for extrusion thereof along and through said die plate. When this type of scroll is employed, the end of bore 11 remote from the paste intake is closed by a bearing block 68 for journaling the free end of the scroll, said bearing block having a cut away portion to provide a clearance space 69 to receive any excess of paste which is forced beyond the outer or terminal end of the spiral flange or scroll thread 67, while still exerting expressing pressure thereupon for discharging the same through an adjacent port 15 for ultimate extrusion through underlying die plate orifices 22.

In Fig. 7 a further modified form of scroll similar to that of Fig. 6 is shown, but adapted for two-way distribution from a central paste intake port 50. This scroll comprises a cylindrical body 70 having, in extension from its central portion adjacent said intake port, a left hand spiral flange or scroll thread 71 extending in one direction toward one end of the expresser head bore 11, and a right hand spiral flange or scroll thread 72 extending in the opposite direction toward the other end of said bore 11. Said spiral flanges or scroll threads are each of gradually diminishing pitch from their paste receiving points toward their remote ends. At the respective remote ends of the scroll thus formed, the respective adjacent ends of the bore 11 are suitably closed by means having cutaway portions 73 for the reception of excess paste forced beyond such scroll ends, and therefrom discharged through adjacent ports 15 for ultimate extrusion through underlying die plate orifices 22. It will be understood that such two-way paste distribution scroll will function, so far as compensating diminution of volumetric capacity and uniform expressing pressure is concerned, in substantially the same manner as above stated with reference to the similar one-way type of Fig. 6.

Another feature of this invention, is to provide means in combination with the expresser head, and cooperative with the external face of the die plate thereof, adapted to automatically cut away the paste formations issuing from the die plate orifices, as such formations attain a desired length. To this end a traveling cutter means of suitable design is mounted beneath the expresser head. In an illustrative embodiment of such cutter means, as shown, the same comprises an endless conveyer arranged beneath and in offset but parallel relation to the length of the expresser head 10, and preferably formed by an endless conveyer chain 80 running over sprockets 81 and 82 adjacent opposite ends of the expresser head 10. Said sprockets 81 and 82 are respectively mounted on vertical shafts 83 and 84 which are each journaled in bottom bearings 85 affixed to bracket extensions 86 of the machine framework, and in top bearings 87 affixed to the carrier beams 25 of said machine framework, or otherwise supported in any convenient manner. One of said shafts, e. g. the shaft 83, operates as a driver, and is adapted to be driven from any suitable source of power at a desired predetermined required speed. An illustrative driving arrangement comprises an electric power motor 88 which is adjustably mounted on a platform 89 suitably supported by the machine framework. Journaled in bearing standards 90, also suitably supported by the machine framework, is a countershaft 91, on which is mounted the driven pulley 92 of a variable speed transmission, the driving pulley 93 of which is mounted on the motor shaft; the power of said driving pulley 93 being transmitted to said driven pulley 92 by the driving belt 94. An adjusting screw 95, operable by a hand-wheel 96, engages the motor base, and may be manipulated to shift the motor back and forth, whereby to alter the speed ratio of the driving and driven pulleys 92—91, and thus the driving speed of the countershaft 91. Affixed on the counter-shaft 91 is a bevel gear 97 which meshes with and drives a bevel gear 98 on the vertical shaft 83, thus operating the cutter conveyer. Supported by and in horizontal longitudinal extension between the cross beams 23 of the machine framework is a track plate 99 having suitably formed trackways 100. Affixed to the conveyer chain 80 is an upstanding cutter carriage plate 101, the lower end of which is adapted to run in the trackways 100. Projecting angularly from the outer face of said carriage plate 100 is a carriage block 102 which rides on the top face of the track plate 99 outwardly of the trackways thereof. Affixed to said carriage block, for outward projection therefrom, is a carrier arm 103, which is adapted to extend beneath and transversely across the row or rows of orifices 22 of the die plate 21. Affixed on said carrier arm 103 is the base block 104 of a knife or cutter blade 105. Said knife or cutter blade is adjusted about the axis of said carrier arm 103, either by rotatably adjusting the latter in the carriage block 100 or by rotatably adjusting the base block 104 on said carrier arm, so that said knife or cutter blade inclines upwardly toward the external face of the die plate 21, with its cutting edge firmly bearing against said external face of the die plate and so as to traverse the orifices 22 thereof.

The conveyer means is provided with at least one knife or cutter blade and supporting carriage means therefor, but may, if desired, be equipped with more than one thereof in suitably spaced relation along the length thereof. One such knife or cutter blade is usually sufficient for cutting long paste forms or strings away from the die. The length of such long paste forms or strings may be predetermined and varied by regulating the speed of the conveyer, and consequently the travel speed of the knife or cutter speed, relative to the rate of extrusion of the paste through the die. With the single knife or cutter blade, the speed of travel may be so regulated as to allow longer or shorter lapse of time for a complete circuit of the same, whereby a slower knife or cutter blade travel will allow a longer time interval of paste issue from the die, and consequently production of paste strings of greater length, and, conversely, whereby a faster knife or cutter blade travel will allow a shorter time interval of paste issue from the die, and consequently production of shorter lengths of paste strings. Length of paste strings may also be varied by employing means for running the conveyer and knife or cutter blade intermittently rather than continuously, or by using a plurality of knives or cutter blades in continuous travel.

To produce short forms of paste, such e. g. as alphabet paste, rings, or other cut forms commonly produced for the trade, the conveyer means would be provided with a considerable number of suitably spaced knives or cutter blades and continuously driven; the spacing of said knives or cutter blades and speed of travel thereof being adapted to determine the particular length of cut paste in any given case.

From the above description it will be understood that the instant invention provides a very simple, compact and yet highly efficient apparatus for continuously extruding alimentary paste, and which is adapted to optionally produce either long, short or cut forms thereof.

It will be further understood that various changes, other than those hereinabove pointed out, could be made in the paste extrusion apparatus of this invention without departing from the scope of the invention as defined in the following claims; it is therefore intended that all matter contained in the above description or shown in the accompanying drawings shall be interpreted as illustrative and not in a limiting sense.

I claim:

1. An extruding apparatus comprising a substantially horizontally disposed expresser head having a longitudinal bore in its upper portion and a paste intake port communicating with said bore, an elongated perforate die plate mounted in the lower portion of said expresser head beneath and parallel to the bore thereof, means providing communication between the side of said bore and said die plate, a scroll rotatable in said bore, the volumetric capacity of said scroll progressively diminishing from a maximum at a point thereof adjacent to the paste intake port as it recedes toward an end point thereof, and an end portion of the expresser head having a clearance space to receive excess paste axially discharged from an adjacent end of said scroll.

2. An extruding apparatus comprising a substantially horizontally disposed expresser head having a longitudinal bore in its upper portion and a past intake port communicating with said bore intermediate its ends, an elongated perforate die plate mounted in the lower portion of said expresser head beneath and parallel to the bore thereof, means providing communication between the side of said bore and said die plate, a scroll rotatable in said bore having left and right scroll threads extending outwardly therealong in opposite directions from a middle portion thereof adjacent said intake port, thereby providing oppositely extending scroll sections adapted to produce two-way distribution of paste to the die plate, the volumetric capacity of each scroll section progressively diminishing from its paste receiving point outwardly therefrom for the purposes described, and an end portion of the expresser head having a clearance space to receive excess paste axially discharged from an adjacent end of said scroll.

3. In apparatus for the purposes described, an elongated horizontal expresser head having a paste receiving chamber in its bottom side provided with a die the orifices of which are disposed to emit paste forms in linearly spaced relation, said head having a cylindrical bore above and coextensive with said chamber and die including lateral means of communication between said bore and chamber, said expresser head having a paste intake leading into said bore, a scroll rotatable in said bore, means to drive said scroll, said scroll comprising a conico-cylindrical body having its small diametric portion disposed adjacent the paste intake of said bore and a large diametric portion adjacent to an end of the bore, a spiral scroll thread of suitable pitch extending along said body in engagement with the bore surface, and said body terminating at a large diametric portion thereof in a cylindrical portion of reduced diameter adapted to form with the adjacent bore walls a clearance space for the reception of excess paste axially discharged by said scroll body.

4. In apparatus for the purposes described, an elongated expresser head having a paste receiving chamber in its bottom side provided with a die the orifices of which are disposed to emit paste forms in linearly spaced relation, said head having a cylindrical bore above and coextensive with said chamber and die including lateral means of communication between said bore and chamber, paste intake means communicating with said bore at a point substantially central between its ends, a scroll rotatable in said bore, and means to drive said scroll, said scroll comprising oppositely extending conico-cylindrical body sections having their small diametric portions joined and positioned adjacent the paste intake of the bore and their large diametric portions positioned respectively adjacent to the respective ends of said bore, one said body section having a left hand spiral scroll thread of suitable pitch extending therealong in engagement with the bore surface, and the other body section having a right hand spiral scroll thread of suitable pitch extending therealong in engagement with the bore surface.

5. In apparatus for the purposes described, an elongated horizontal expresser head having a paste receiving chamber in its bottom side provided with a die the orifices of which are disposed to emit paste forms in linearly spaced relation, said head having a cylindrical bore above and coextensive with said chamber and die including lateral means of communication between said bore and chamber, paste intake means communicating with said bore at a point substantially central between its ends, a scroll rotatable in said bore, means to drive said scroll, said scroll comprising oppositely extending conico-cylindrical body sections having their small diametric portions joined and positioned adjacent the paste intake of the bore and their large diametric portions positioned respectively adjacent to the respective ends of said bore, one said body section having a left hand spiral scroll thread of suitable pitch extending therealong in engagement with the bore surface, and the other body section having a right hand spiral scroll thread of suitable pitch extending therealong in engagement with the bore surface, and each scroll body terminating at its large diametric portion in a cylindrical portion of reduced diameter adapted to form with the adjacent bore walls a clearance space for the reception of excess paste axially discharged by the scroll body.

6. An extruding apparatus comprising a substantially horizontally disposed expresser head having a longitudinal bore of uniform diameter in its upper portion and a paste intake port communicating with said bore, a scroll rotatable in said bore, the volumetric capacity of said scroll progressively diminishing from a point thereof adjacent to the paste intake port as it recedes toward an end point thereof, the lower portion of said expresser head having a downwardly open chamber beneath and coextensive with the bore thereof and separated from said bore by an intermediate wall portion of the latter, said separating wall portion having openings therethrough leading from the side of said bore into said chamber, and an elongated perforate die plate detachably mounted across the open bottom of said chamber.

7. An extruding apparatus comprising a substantially horizontally disposed expresser head having a longitudinal bore of uniform diameter in its upper portion and a paste intake port communicating with said bore intermediate its ends, a scroll rotatable in said bore having left and right scroll threads extending outwardly therealong in opposite directions from a middle portion thereof adjacent said intake port, thereby providing oppositely extending scroll sections adapted to produce two-way distribution of paste through said bore, the volumetric capacity of each scroll section progressively diminishing from its paste receiving point outwardly therefrom for the purposes described, the lower portion of said expresser head having a downwardly open chamber beneath and coextensive with the bore thereof and separated from said bore by an intermediate wall portion of the latter, said separating wall portion having spaced openings along the same leading from the side of said bore into said chamber, and an elongated perforate die plate detachably mounted across the open bottom of said chamber.

8. In an extruding apparatus having a horizontal expresser head provided with an elongated perforate die plate along its under side, a traveling cutting means adapted to traverse the external face of said die from end to end thereof to cut away extruded paste forms issued therefrom, and means to operate said cutting means, comprising an endless conveyer means parallel to the expresser head, at least one cutting knife carried by said conveyer means with its cutting edge disposed to oppose the external face of said die when moved therealong by a course of said conveyer means which travels in one direction adjacent to said expresser head, and means to continuously drive said conveyer means.

JOSEPH DE FRANCISCI.

REFERENCES CITED

The following references are of record in the file of this patent:

UNITED STATES PATENTS

| Number | Name | Date |
| --- | --- | --- |
| 1,143,510 | Courtine | June 15, 1915 |
| 1,540,779 | Hollenbeck | June 9, 1925 |
| 1,955,342 | Pizzini et al. | Apr. 17, 1934 |
| 2,026,667 | Braibanti et al. | Jan. 7, 1936 |
| 2,075,476 | Sizer | Mar. 30, 1937 |
| 2,197,988 | Tanzi | Apr. 23, 1940 |
| 2,229,422 | Schade et al. | Jan. 21, 1941 |